US012466594B2

(12) United States Patent
Li et al.

(10) Patent No.: US 12,466,594 B2
(45) Date of Patent: Nov. 11, 2025

(54) HOUSEHOLD VACUUM SEALER SUPPLIED AC POWER AND HEATED

(71) Applicants: Qincan Li, Dongguan (CN); Haibo Peng, Dongguan (CN)

(72) Inventors: Qincan Li, Dongguan (CN); Haibo Peng, Dongguan (CN)

(73) Assignee: Bonsen Electronics Limited, Guangdong Province (CN)

( * ) Notice: Subject to any disclaimer, the term of this patent is extended or adjusted under 35 U.S.C. 154(b) by 223 days.

(21) Appl. No.: 18/239,757

(22) Filed: Aug. 30, 2023

(65) Prior Publication Data
US 2025/0074640 A1  Mar. 6, 2025

(51) Int. Cl.
*B65B 31/02* (2006.01)
*B29C 65/22* (2006.01)

(52) U.S. Cl.
CPC .......... *B65B 31/024* (2013.01); *B29C 65/221* (2013.01)

(58) Field of Classification Search
CPC ... B65B 31/024; B65B 31/048; B65B 51/146; B29C 65/221; B29C 65/223; B29C 65/224; B29C 66/43121
See application file for complete search history.

(56) References Cited

U.S. PATENT DOCUMENTS

| 4,378,266 A | * | 3/1983 | Gerken | B31B 70/99 219/508 |
| 2004/0060262 A1 | * | 4/2004 | Harges | B29C 66/8221 53/512 |
| 2005/0050855 A1 | * | 3/2005 | Baptista | B65B 31/046 53/512 |
| 2018/0370669 A1 | * | 12/2018 | Xu | B29C 65/02 |

* cited by examiner

Primary Examiner — George R Koch
Assistant Examiner — Christopher C Caillouet

(57) ABSTRACT

A household vacuum sealer contains: a base, a lid, and a hot-melt sealing element. The base includes a receiving chamber for accommodating a control circuit and a vacuum pump. The base also includes a vacuuming chamber and an accommodation chamber. The hot-melt sealing element includes a holder, a mica slice, a laminated heating layer, the insulated composite layer, and a protective cap. The insulated composite layer includes multiple insulated tape layers. The laminated heating layer includes a high-temperature resistance tapes made of polyimide, a metal resistance tape, two electrical connection films, and two alternating current (AC) electrodes. The mica slice is parallelly fixed on a top of the holder. The laminated heating layer includes the two electrical connections. Furthermore, the protective cap is covered on the insulated composite layer and includes a hollowly elongated zone.

10 Claims, 4 Drawing Sheets

HOUSEHOLD VACUUM SEALER SUPPLIED AC POWER AND HEATED

TECHNICAL FIELD

The present disclosure relates to a household vacuum sealer, and more particularly to a household vacuum sealer supplied AC power and heated.

BACKGROUND

The heating wire of a conventional household vacuum sealer is powered by low-voltage direct currents. To improve the working efficiency and hot sealing effect of the heating wire, the household vacuum sealer starts to use AC alternating current to power the heating wire. Because the surface of the heating wire of the household vacuum sealer is only covered with 1-3 layers of insulating tape, but there are hidden safety hazards in insulation and there is no anti-shock function. In addition, the insulating tape cannot pass the high voltage test. In use, the exposed insulating tape is broken easily to cause electric shock and safety hazards. This is why most household vacuum sealers do not directly use AC power.

The present invention has arisen to mitigate and/or obviate the afore-described disadvantages.

SUMMARY

A primary aspect of the present invention is to provide a household vacuum sealer which is simplified to reduce fabrication and avoid using danger.

To obtain above-mentioned aspect, a household vacuum sealer provided by the present invention contains: a base, a lid, and a hot-melt sealing element.

The lid is rotatably fixed on the base, and the base includes a receiving chamber defined in the base to accommodate a control circuit and a vacuum pump, the base also includes a vacuuming chamber and an accommodation chamber which are parallelly formed on a top of a side of the base, the accommodation chamber is in front of the vacuuming chamber, the hot-melt sealing element is engaged in the accommodation chamber, the vacuuming pump is in communicated with the vacuuming chamber via an air tube, and the control circuit is electrically connected with the vacuuming pump and the hot-melt sealing element.

The hot-melt sealing element includes a holder, a mica slice, a laminated heating layer, the insulated composite layer, and a protective cap.

The insulated composite layer includes multiple insulated tape layers which are staked and adhered to form the insulated composite layer.

The laminated heating layer includes a high-temperature resistance tapes made of polyimide and a metal resistance tape adhered on the high-temperature resistance tapes of the laminated heating layer. The laminated heating layer further includes the two electrical connection films formed on two sides thereof, and two alternating current (AC) electrodes arranged on the two electrical connection films respectively. Two sides of the metal resistance tape extend to two electrical connection films respectively and are electrically connected with the two alternating current (AC) electrodes.

The mica slice is parallelly fixed on a top of the holder, the laminated heating layer is mounted on a top of the mica slice, the laminated heating layer includes two electrical connection films extending to the holder, and the insulated composite layer is adhered in a top of the laminated heating layer.

The protective cap is covered on the insulated composite layer, the protective cap has a hollowly elongated zone horizontally extending on a middle portion thereof, and an insulation tap is exposed outside the hollowly elongated zone to form a bag sealing area. A bottom of the protective cap is engaged with the holder, the mica slice, the laminated heating layer, the insulated composite layer and the protective cap to form an independent element. The holder is engaged on the base, and a top of the hot-melt sealing element is not lower than a top of the base.

The insulated composite layer has multiple Teflon tapes and multiple high-temperature resistance tapes made of polyimide. The insulated composite layer has a first Teflon tape fixed on a top of the insulated composite layer, three high-temperature resistance tapes defined on a middle section of the insulated composite layer, and a second Teflon tape located on a bottom of the insulated composite layer.

The hot-melt sealing element includes a negative temperature coefficient (NTC) thermistor configured to control a temperature of the laminated heating layer, and the hot-melt sealing element includes a thermal fuse configured to avoid the temperature of the laminated heating layer exceeding a set safety value.

Thereby, the household vacuum sealer of the present invention contains:

1) A respective one high-temperature resistance tape of the hot-melt sealing element has a polyimide substrate and an adhesive film adhered on a bottom of the polyimide substrate, and the metal resistance tape is etched and adhered on the polyimide substrate to obtain heating, insulation, and flexibility.
2) The alternating currents are directly supplied to the laminated heating layer so as to enhance a temperature of the household vacuum sealer quickly and to conduct heat energy via the insulated composite layer quickly and to avoid an electric shock by using the protective cap. Preferably, the insulated composite layer is not broken. Thus, the household vacuum sealer is simplified and has high working efficiency and low fabrication cost;

Other objects and features will be in part apparent and in part pointed out hereinafter.

DETAILED DESCRIPTION

Figure 1:
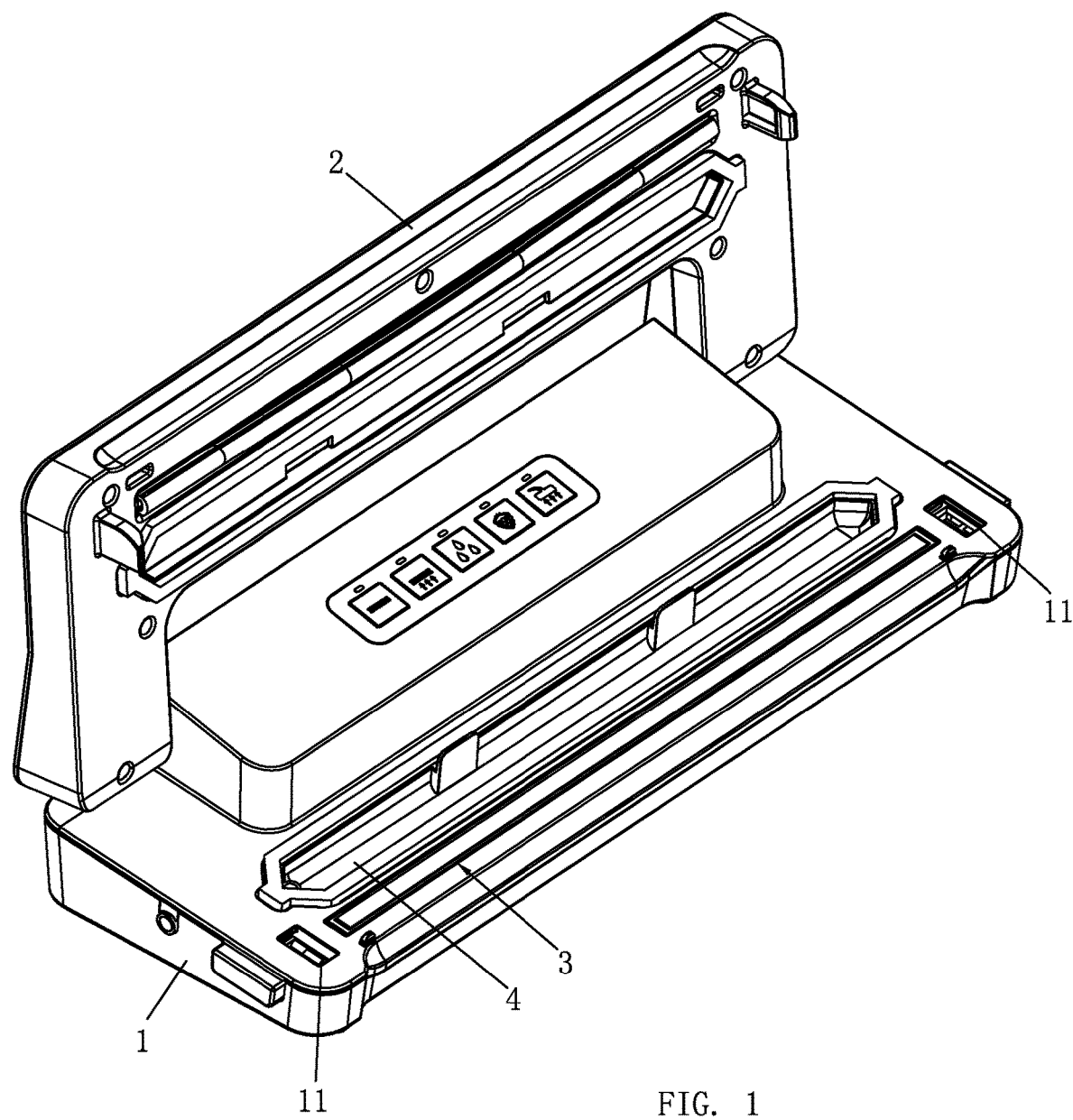
FIG. 1 is perspective view showing the assembly of a household vacuum sealer according to a preferred embodiment of the present invention.
Figure 2:
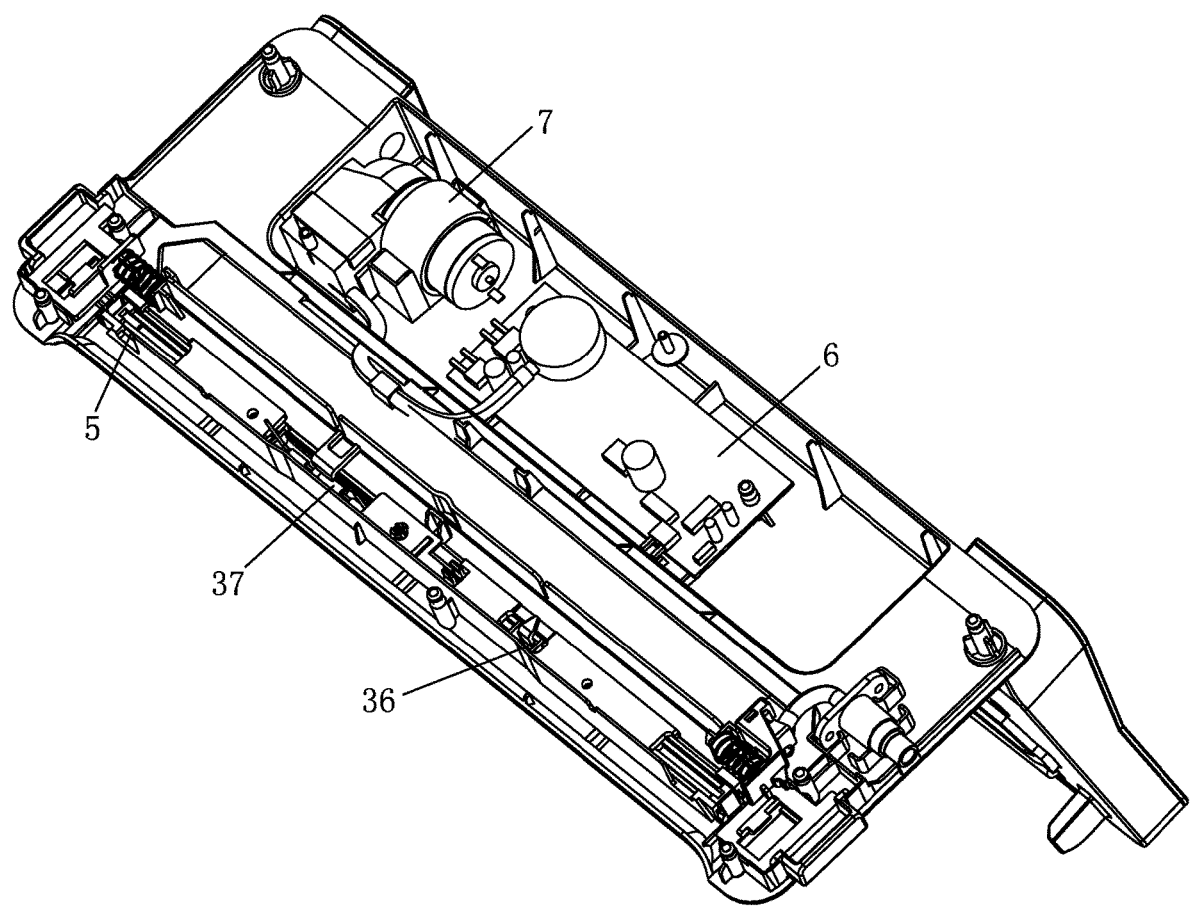
FIG. 2 is perspective view showing the assembly of an interior of the household vacuum sealer according to the preferred embodiment of the present invention.
Figure 3:
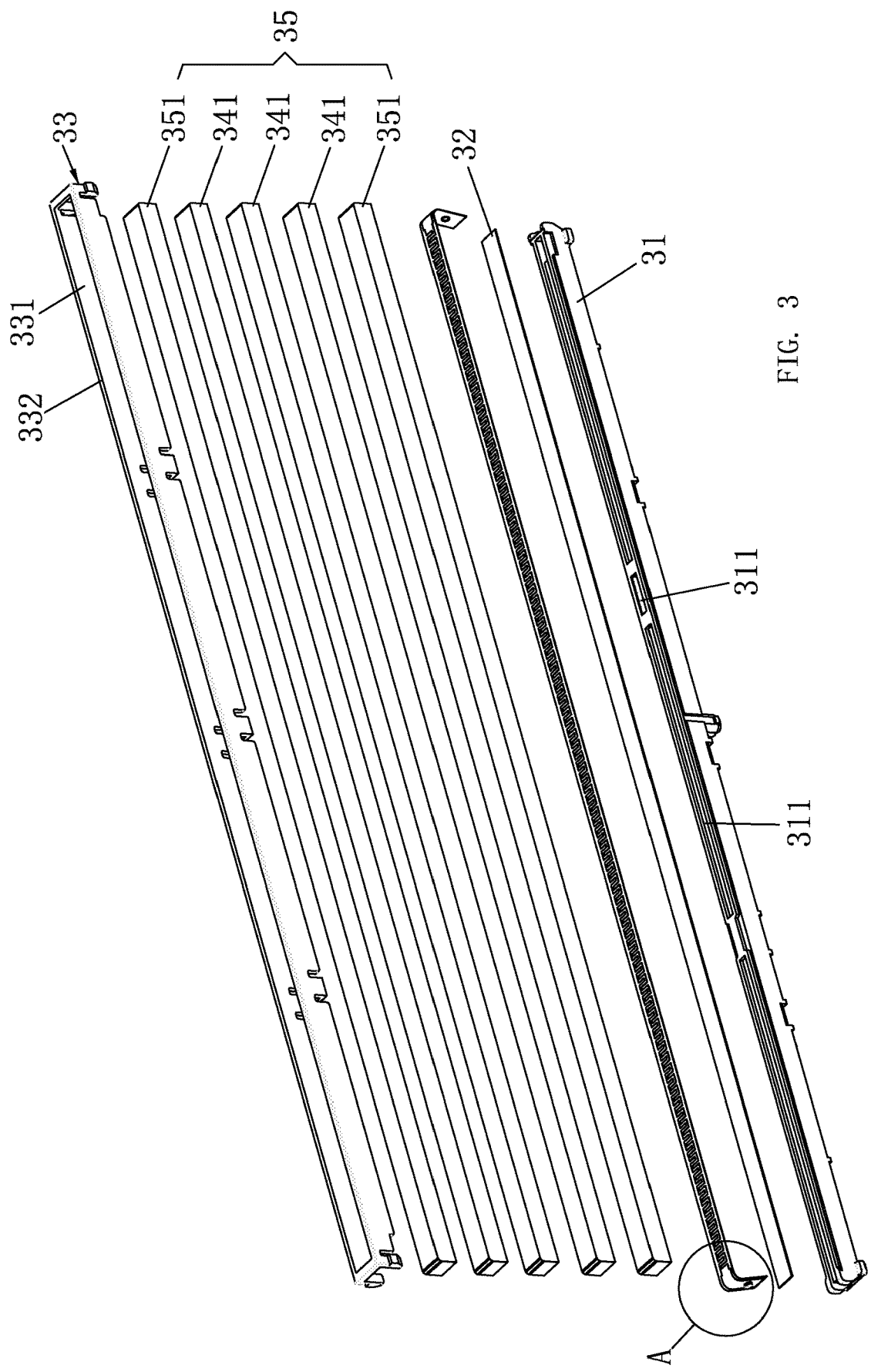
FIG. 3 is a perspective view showing the exploded components of a hot-melt sealing element of the household vacuum sealer according to the preferred embodiment of the present invention.
Figure 4:
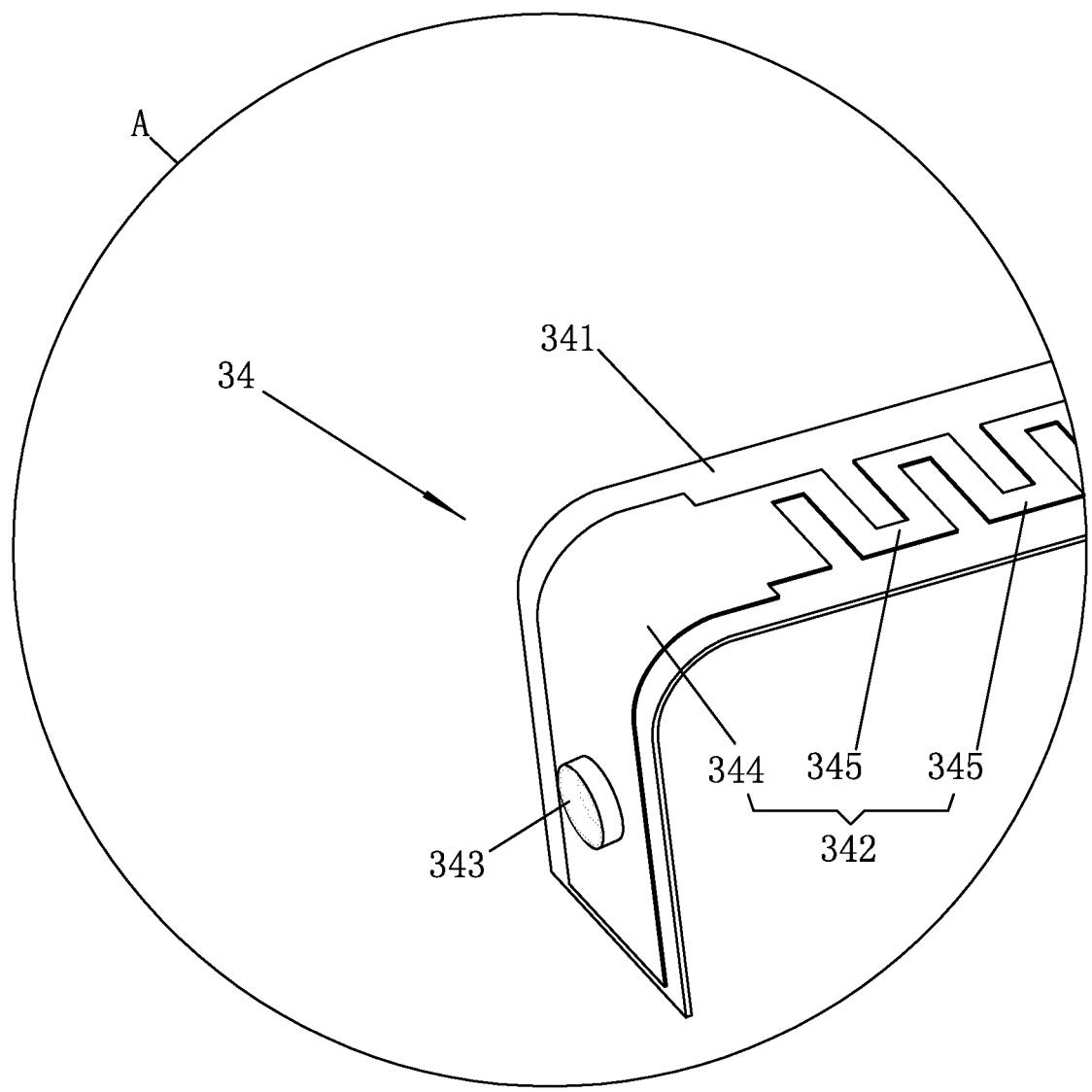
FIG. 4 is an amplified perspective view of a portion A of FIG. 3.

With reference to FIGS. 1-4, a household vacuum sealer supplied AC power and heated according to a preferred embodiment of the present invention comprises: a base 1, a lid 2, and a hot-melt sealing element 3. The lid 2 is rotatably fixed on the base 1, and the base 1 includes a receiving chamber defined therein to accommodate a control circuit 6 and a vacuum pump 7. The base 1 also includes a vacuuming chamber 4 and an accommodation chamber 5 which are formed on a top of a side of the base 1, wherein the accommodation chamber 5 is in front of the vacuuming chamber 4, the hot-melt sealing element 3 is engaged in the accommodation chamber 5, the vacuuming pump 7 is in communicated with the vacuuming chamber 4 via an air tube, and the control circuit 6 is electrically connected with the vacuuming pump 7 and the hot-melt sealing element 3. The base 1 also includes two engagement portions 11 respectively formed on two sides of the top of a front end thereof and proximate to the accommodation chamber 5, and two sides of the hot-melt sealing element 3 extend to two sides of the accommodation chamber 5. The lid 2 includes an adhesive strip received in a bottom of a front end thereof and abutting against an insulated composite layer 35 of the hot-melt sealing element 3.

The hot-melt sealing element 3 includes a holder 31, a mica slice 32, a laminated heating layer 34, the insulated composite layer 35, and a protective cap 33. The protective cap 33 is covered on the insulated composite layer 35, the protective cap 33 has a hollowly elongated zone 331 horizontally extending on a middle portion thereof, and an insulation tap is exposed outside the hollowly elongated zone 331 to form a bag sealing area. The protective cap 33 has a press fringe 332 formed on a top thereof and surrounding the hollowly elongated zone 331, wherein the press fringe 332 is engaged with two opposite sides of the insulated composite layer 35. Alternatively, the press fringe 332 is engaged on four sides of the insulated composite layer 35.

A bottom of the protective cap 33 is engaged with the holder 31, the mica slice 32, the laminated heating layer 34, the insulated composite layer 35 and the protective cap 33 to form an independent element. The mica slice 32 is parallelly fixed on a top of the holder 31, the laminated heating layer 34 is mounted on a top of the mica slice 32, the laminated heating layer 34 includes two electrical connection films extending to the holder 31, and the insulated composite layer 35 is adhered in a top of the laminated heating layer 34.

The insulated composite layer 35 includes multiple insulated tape layers which are staked and adhered to form the insulated composite layer 35. Two sides of the insulated composite layer 35 extend to two sides of the holder 31, and a front end and a rear end of the insulated composite layer 35 extend downward to the holder 31, and the insulated composite layer 35 covers the laminated heating layer 34.

Preferably, the insulated composite layer 35 has multiple Teflon tapes 351 and multiple high-temperature resistance tapes 341 made of polyimide, wherein the insulated composite layer 35 has a first Teflon tape 351 fixed on a top of the insulated composite layer 35, three high-temperature resistance tapes 341 defined on a middle section of the insulated composite layer 35, and a second Teflon tape 351 located on a bottom of the insulated composite layer 35. The laminated heating layer 34 includes a high-temperature resistance tapes 341 made of polyimide and a metal resistance tape 342 adhered on the high-temperature resistance tapes 341 of the laminated heating layer 34, wherein the laminated heating layer 34 further has the two electrical connection films formed on two sides thereof, two alternating current (AC) electrodes 343 arranged on the two electrical connection films respectively, wherein two sides of the metal resistance tape 342 extend to two electrical connection films respectively and are electrically connected with the two alternating current (AC) electrodes 343.

A respective one high-temperature resistance tape has a polyimide substrate and an adhesive film adhered on a bottom of the polyimide substrate, such that the respective one high-temperature resistance tape is configured to resist a high temperature of 200° C. to 300° C. and have insulation and flexibility. The laminated heating layer 34 includes the high-temperature resistance tapes 341 on which the metal resistance tape 342 is adhered to obtain heating, insulation, and flexibility.

The laminated heating layer 34 is a heating element and is connected with the holder 31 and the protective cap 33, such that the hot-melt sealing element 3 is one-piece formed and is connected on the base 1, thus simplifying and easily producing the hot-melt sealing element 3, reducing fabrication cost and having quick replacement and maintenance of the hot-melt sealing element 3.

The protective cap 33 is capable of avoiding an electric shock and a damage of the insulated composite layer 35.

The hot-melt sealing element 3 includes a negative temperature coefficient (NTC) thermistor 37 configured to control a temperature of the laminated heating layer 34, and the hot-melt sealing element 3 includes a thermal fuse 36 configured to avoid the temperature of the laminated heating layer 34 exceeding a set safety value. The control circuit 6 is electrically connected with the NTC thermistor 37 and the thermal fuse 36. The holder 31 has a groove or a cavity 311 passing through a top thereof and configured to receive the NTC thermistor 37 and the thermal fuse 36, and the NTC thermistor 37 and the thermal fuse 36 abut against the a bottom of the mica slice 32.

The metal resistance tape 342 is etched to form an elongated strap shape and has a resistor with a set resistance value, wherein the metal resistance tape 342 has two conductive sheets 344 not etched, formed on two sides of the metal resistance tape 342, and adhered on the two electrical connection films of the laminated heating layer 34, wherein the laminated heating layer 34 bends downward and adhered on two sides of the holder 31. The two AC electrodes 343 are riveted on two copper rivets of the two electrical connection films of the laminated heating layer 34, and the two copper rivets are riveted on the two electrical connection films and the two conductive sheets 344 of the laminated heating layer 34. The holder 31 is engaged on the base 1, and a top of the hot-melt sealing element 3 is not lower than a top of the base 1.

A length direction of the hot-melt sealing element 3 is parallel to a horizontal direction of the hot-melt sealing element 3, and a longitudinal direction of the hot-melt sealing element 3 is parallel to a front and back direction of the hot-melt sealing element 3, wherein the metal resistance tape 342 is located on a middle section of the laminated heating layer 34 and is etched to form a resistance metal wire twisting on the middle section of the laminated heating layer in the longitudinal direction, wherein two ends of the resistance metal wire are one-piece connected with the two conductive sheets 344.

The conventional hot-melt sealing element 3 only includes a heating wire with a circular cross section, and a diameter of the heating wire is 1 mm to 2 mm, wherein an arcuate portion of an upper end of the heating wire is protruded, a contact width of the heating wire in a longitudinal direction is 50% of the diameter of the heating wire, thus having a small contact width to cause a poor sealing capacity.

A surface of the metal resistance tape 342 is plane to obtain a plan and large contact area, thus producing quick heat conduction. The metal resistance tape 342 has the set resistance value to satisfy a heating resistance value and has a width extending in the longitudinal direction, wherein the width of the metal resistance tape 342 is within 2 mm to 10 mm so as to seal a bag tightly. The width of the metal resistance tape 342 is equal to a width of the adhesive strip configured to hot seal the bag. For example, when the width of the metal resistance tape 342 is 5 mm, the width of the adhesive strip is 5 mm to vacuum sealing the bag tightly.

The metal resistance tape 342 includes multiple connected resistance cells 345, wherein a respective one connected resistance cell 345 has a longitudinal forward extension and a longitudinal backward extension, the width of the resistance metal wire is equal to a width of the longitudinal forward extension or the longitudinal backward extension of the respective one connected resistance cell 345, and a width of a hot sealing width of the hot-melt sealing element is equal to a width of the resistance metal wire.

The respective one connected resistance cell 345 is in any one of an U shape, a V shape and a wave shape, wherein a height of a horizontal cross-section of the respective one connected resistance cell 345 is equal to a height of the metal resistance tape 342, and a width of a horizontal cross-section of the respective one connected resistance cell 345 is 0.2 mm to 2 mm.

The resistance metal wire has a horizontal cross-section with a width of 0.5 mm to 1 mm, and a total resistance value of the resistance metal wire is 100 ohm to 150 ohm. For example, when the resistance value of the metal resistance tape 342 is 110 ohm, a using voltage value of the metal resistance tape 342 is 120V, and alternating currents of 60 Hz are supplied to the household vacuum sealer in a power of 120 W to 130 W, the household vacuum sealer is operated automatically or manually so that a sealing time of the household vacuum sealer is reduced to 3 seconds to 5 seconds from conducting the power to seal the bag, thus decreasing 50% to 70% of heating time compared with the heating time of the conventional household vacuum sealer to save heat consumption.

When the metal resistance tape 342 has a width of more than 3 mm or more than 5 mm, the metal resistance tape 342 is provided with the multiple connected resistance cell 345 with a longer length in a same limited space to obtain a required resistance value and have sufficient power and heating energy, thus sealing the bag quickly.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A household vacuum sealer comprising: a base, a lid, and a hot-melt sealing element;

the lid being rotatably fixed on the base, and the base including a receiving chamber defined in the base to accommodate a control circuit and a vacuum pump, the base also including a vacuuming chamber and an accommodation chamber which are parallely formed on a top of a side of the base, the accommodation chamber being in front of the vacuuming chamber, the hot-melt sealing element being engaged in the accommodation chamber, the vacuuming pump being in communicated with the vacuuming chamber via an air tube, and the control circuit being electrically connected with the vacuuming pump and the hot-melt sealing element;

wherein the hot-melt sealing element includes a holder, a mica slice, a laminated heating layer, an insulated composite layer, and a protective cap;

wherein the insulated composite layer includes multiple insulated tape layers which are staked and adhered to form the insulated composite layer;

wherein the laminated heating layer includes a high-temperature resistance tapes made of polyimide and a metal resistance tape adhered on the high-temperature resistance tapes of the laminated heating layer, wherein the laminated heating layer further includes the two electrical connection films formed on two sides thereof, and two alternating current (AC) electrodes arranged on the two electrical connection films respectively, wherein two sides of the metal resistance tape extend to two electrical connection films respectively and are electrically connected with the two alternating current (AC) electrodes;

wherein the mica slice is parallely fixed on a top of the holder, the laminated heating layer is mounted on a top of the mica slice, the laminated heating layer includes two electrical connection films extending to the holder, and the insulated composite layer is adhered in a top of the laminated heating layer; and wherein the protective cap is covered on the insulated composite layer, the protective cap has a hollowly elongated zone horizontally extending on a middle portion thereof, and an insulation tape is exposed outside the hollowly elongated zone to form a bag sealing area; wherein a bottom of the protective cap is engaged with the holder, the mica slice, the laminated heating layer, the insulated composite layer and the protective cap to form an independent element;

wherein the insulated composite layer has multiple Polytetrafluoroethylene (PTFE) tapes and multiple high-temperature resistance tapes made of polyimide, wherein the insulated composite layer has a first Polytetrafluoroethylene (PTFE) tape fixed on a top of the insulated composite layer, three high-temperature resistance tapes defined on a middle section of the insulated composite layer, and a second Polytetrafluoroethylene (PTFE) tape located on a bottom of the insulated composite layer; two sides of the insulated composite layer extend to two sides of the holder, and a front end and a rear end of the insulated composite layer extend downward to the holder, wherein the insulated composite layer covers the laminated heating layer.

2. The household vacuum sealer as claimed in claim 1, wherein the hot-melt sealing element includes a negative temperature coefficient (NTC) thermistor configured to control a temperature of the laminated heating layer, and the hot-melt sealing element includes a thermal fuse configured to avoid the temperature of the laminated heating layer exceeding a set safety value; the control circuit is electrically connected with the NTC thermistor and the thermal fuse; the holder has a groove or a cavity passing through a top thereof and configured to receive the NTC thermistor and the thermal fuse, and the NTC thermistor and the thermal fuse abut against the a bottom of the mica slice.

3. The household vacuum sealer as claimed in claim 1, wherein the protective cap has a press fringe formed on a top thereof and surrounding the hollowly elongated zone, wherein the press fringe is engaged with two opposite sides or four sides of the insulated composite layer.

4. The household vacuum sealer as claimed in claim 1, wherein the metal resistance tape is etched to form an elongated shape and has a resistor with a set resistance value;
   wherein the metal resistance tape has two conductive sheets not etched, formed on two sides of the metal resistance tape, and adhered on the two electrical connection films of the laminated heating layer, wherein the laminated heating layer bends downward and adhered on two sides of the holder, the two AC electrodes are riveted on two copper rivets of the two electrical connection films of the laminated heating layer, and the two copper rivets are riveted on the two electrical connection films and the two conductive sheets of the laminated heating layer; and
   wherein the holder is engaged on the base, and a top of the hot-melt sealing element is not lower than a top of the base.

5. The household vacuum sealer as claimed in claim 4, wherein the metal resistance tape is located on a middle section of the laminated heating layer and is etched to form a resistance metal wire twisting on the middle section of the laminated heating layer in the longitudinal direction, wherein two ends of the resistance metal wire are one-piece connected with the two conductive sheets.

6. The household vacuum sealer as claimed in claim 5, wherein the metal resistance tape includes multiple connected resistance cells, and a respective one connected resistance cell has a longitudinal forward extension and a longitudinal backward extension, wherein the width of the resistance metal wire is equal to a width of the longitudinal forward extension or the longitudinal backward extension of the respective one connected resistance cell, and a width of a hot sealing width of the hot-melt sealing element is equal to a width of the resistance metal wire.

7. The household vacuum sealer as claimed in claim 6, wherein the respective one connected resistance cell is in an U shape, a height of a horizontal cross-section of the respective one connected resistance cell is equal to a height of the metal resistance tape, and a width of a horizontal cross-section of the respective one connected resistance cell is 0.2 mm to 2 mm.

8. The household vacuum sealer as claimed in claim 6, wherein the resistance metal wire has a horizontal cross-section with a width of 0.5 mm to 1 mm, and a total resistance value of the resistance metal wire is 100 ohm to 150 ohm.

9. The household vacuum sealer as claimed in claim 8, wherein a respective one high-temperature resistance tape has a polyimide substrate and an adhesive film adhered on a bottom of the polyimide substrate, such that the respective one high-temperature resistance tape is configured to resist a high temperature of 200° C. to 300° C. and have insulation and flexibility;
   wherein the laminated heating layer includes the high-temperature resistance tapes on which the metal resistance tape is adhered to obtain heating, insulation, and flexibility.

10. The household vacuum sealer as claimed in claim 9, wherein the base also includes two engagement portions respectively formed on two sides of the top of a front end thereof and proximate to the accommodation chamber, and two sides of the hot-melt sealing element extend to two sides of the accommodation chamber, wherein the lid includes an adhesive strip received in a bottom of a front end thereof and abutting against an insulated composite layer of the hot-melt sealing element.

* * * * *